Sept. 13, 1938. A. HOLT 2,130,183
DECORATIVE MAT, SIGN, OR THE LIKE
Filed Feb. 26, 1937
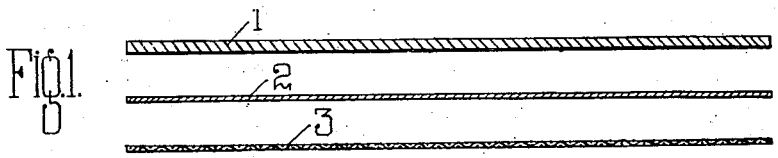
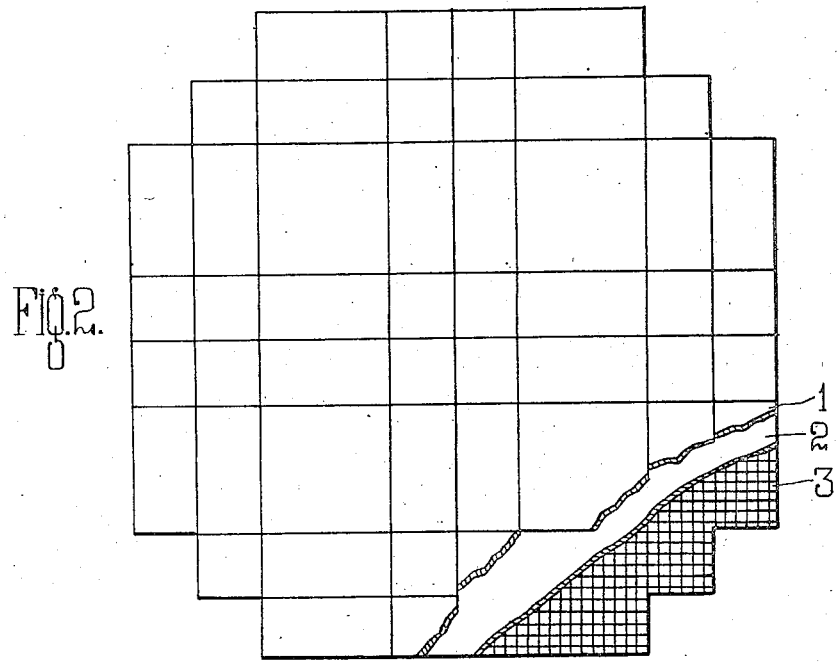
Inventor
Arthur Holt
By: Mason & Porter
Attorneys Patented Sept. 13, 1938

2,130,183

UNITED STATES PATENT OFFICE 2,130,183

DECORATIVE MAT, SIGN, OR THE LIKE

Arthur Holt, Great Crosby, England

Application February 26, 1937, Serial No. 127,978
In Great Britain March 16, 1936

2 Claims. (Cl. 41—22)

This invention relates to improvements in flexible decorative articles such as mats, signs, coverings for solid surfaces or the like.

It has already been proposed to make such articles by mounting strips of glass, either plain, coloured or silvered, upon a foundation of fabric and then to cut the glass by means of a diamond so as to make a flexible mat or sign. It is difficult to find a satisfactory foundation layer which complies with all the necessary requirements.

According to the present invention flexible mats or signs of this kind are made in which the glass or like material is mounted upon a foundation consisting of a very thin sheet of natural or compressed cork.

Cork possesses a number of useful properties which make it especially suitable as a foundation material. Thus the cork acts as a flexible resilient and shock-absorbing layer which prevents fracture of the mat. Further, the cork is absorbent and takes the adhesive well, so that union with the continuous fabric backing is obtained whereby the whole of the glass strips are held securely together, by a waterproof material. The foundation of cork may be supported by a continuous backing preferably a layer of paper or fabric. A small margin may be left round the outside of the mat, though this may not be necessary if an open weaved fabric is used; this forms a very efficient backing which bends readily and yet supplies adequate support.

Again, the cork has no grain so that it can be bent readily in any direction after the glass has been cut. Also the cork resists heat in cases where the mats are exposed to high temperatures.

Alternatively, the edge of the mat may be bound by a strip of adhesive tape or like material, which forms a small margin round the top of the mat and extends round the vertical edge to form a margin on the back of the mat.

The invention is illustrated by way of example in the accompanying drawing, in which Figure 1 shows the three separate layers and Fig. 2 shows the finished article with the middle and top layers broken away at one corner. In the drawing, 1 is the glass, 2 the compressed cork and 3 an open weaved fabric. The layers are secured by an adhesive, preferably consisting of a suitably plasticized spirit-soluble resin and an inert mineral filler dispersed in a volatile solvent. After the layers have been stuck together and dried, the glass is cut with a diamond and broken along the lines shown; the cork layer may be either partially or completely broken along the lines.

After cutting the glass, the mat is bent along each line of cut, by placing it on the edge of a table, and the sharp edges are smoothed off by rubbing with a flat carborundum stone.

I declare that what I claim is:—

1. A flexible decorative mat consisting of pieces of glass cut by breaking and mounted on a thin layer of cork provided with a fabric backing.

2. Process of making a flexible decorative mat consisting in uniting by an adhesive a thin sheet of glass to a thin sheet of cork and to a fabric backing, cutting and breaking the glass, and smoothing the edges of the broken glass.

ARTHUR HOLT.